US007886891B2

(12) United States Patent
Ranger et al.

(10) Patent No.: US 7,886,891 B2
(45) Date of Patent: Feb. 15, 2011

(54) DEFLECTOR ASSEMBLY, VALVE ARRANGEMENT FOR A DEFLECTOR ASSEMBLY AND METHOD FOR CALIBRATING SAME

(75) Inventors: Michel Ranger, Lachine (CA); Markus Zweili, Roxboro (CA)

(73) Assignee: Sidel Participations, Octeville-sur-Mer (FR)

( * ) Notice: Subject to any disclaimer, the term of this patent is extended or adjusted under 35 U.S.C. 154(b) by 1400 days.

(21) Appl. No.: 11/356,797

(22) Filed: Feb. 17, 2006

(65) Prior Publication Data
US 2007/0209906 A1    Sep. 13, 2007

(51) Int. Cl.
B65G 25/00 (2006.01)
B65G 25/04 (2006.01)
B65G 47/10 (2006.01)
B65G 47/46 (2006.01)

(52) U.S. Cl. ............... 198/370.02; 198/750.5; 198/750.1; 198/370.07; 198/463.2; 198/370.01; 209/653; 209/552; 209/555

(58) Field of Classification Search ............ None
See application file for complete search history.

(56) References Cited

U.S. PATENT DOCUMENTS

| 3,148,760 | A |   | 9/1964  | Gerrity     |            |
|-----------|---|---|---------|-------------|------------|
| 3,249,200 | A |   | 5/1966  | Rowe        |            |
| 3,679,041 | A |   | 7/1972  | Parkell     |            |
| 3,735,854 | A | * | 5/1973  | Hirsch et al. | 198/468.01 |
| 4,321,994 | A |   | 3/1982  | Heuft       |            |
| 4,369,873 | A |   | 1/1983  | Heuft       |            |
| 4,462,519 | A |   | 7/1984  | Parkell et al. |         |
| 4,986,407 | A |   | 1/1991  | Heuft       |            |
| 6,003,660 | A | * | 12/1999 | Foster      | 198/750.5  |

FOREIGN PATENT DOCUMENTS

| RU | 2112695 C1     | 6/1998  |
|----|----------------|---------|
| WO | WO-86/06356 A  | 11/1986 |
| WO | WO-2005/023689 A | 3/2005 |

* cited by examiner

Primary Examiner—Gene Crawford
Assistant Examiner—Yolanda Cumbess
(74) Attorney, Agent, or Firm—Allen, Dyer, Doppelt, Milbrath & Gilchrist, P.A.

(57) ABSTRACT

An assembly comprising a plurality of pistons, each of the pistons comprising of a cylinder and a piston rod, a first collar for supporting the cylinders at a first end and a second collar for supporting the cylinders at a second end, for each of the cylinders, a first air inlet through the first collar into the first cylinder end and a second air inlet through the second collar into the second cylinder end, a plurality of valves, each of the valves connected to a source of compressed air, and a plurality of air hoses interconnecting each of the valves with one of the air inlets. Also, a method comprising the steps of providing a sensor for sensing when the piston is in a first position, placing the piston in the first position, calculating a first time interval between commanding the piston to move from the first position to a second position and when the piston is no longer in the first position, calculating a second time interval between commanding the piston to move from the second position to the first position and when the piston is in the first position. The reaction time interval comprises the first time interval and the travel time interval comprises the second time interval less the first time interval.

7 Claims, 10 Drawing Sheets

DEFLECTOR ASSEMBLY, VALVE ARRANGEMENT FOR A DEFLECTOR ASSEMBLY AND METHOD FOR CALIBRATING SAME

FIELD OF THE INVENTION

The present invention relates to a deflector assembly, a valve arrangement for a deflector assembly and a method for calibrating same. In particular, the present invention relates to a deflector assembly for selectively deflecting articles travelling along a conveyor belt laterally wherein the assembly is driven by a plurality of valves interconnected using the same valve collar.

BACKGROUND TO THE INVENTION

The prior art reveals a variety of mechanisms for deflecting articles travelling along a conveyor belt laterally. These range from simple gates which are lowered into the path of the article to more complicated devices which comprise pushers or extensors which travel with the belt. These second species of mechanisms typically allow for selective deflection of even closely spaced items travelling along the conveyor belt. This allows for particular articles from a stream of articles to be selectively deflected, for example when the article fails some sort of quality control check, such as a bottle which is not completely filled or the like.

In particular, the prior art discloses mechanisms comprised of a plurality of extensors or segments which may be individually extended or retracted by pneumatic pistons. The distance of travel of subsequent segments is greater than that of the previous segments, thereby providing for a steadily increasing deflection. Typically, the segments have an angled deflection face which comes into contact with the article. The segments are sequentially extended into the path of travel of the article to be deflected and may be immediately retracted subsequent the deflection in order to not foul the path of travel of a subsequent article. In order to control the extension and retraction of the pistons, such prior art devices take advantage of a plurality of electronically controlled valves and a source of compressed air.

One drawback of these prior art devices is that the width of the segments is limited by the positioning of the pistons relative to one another. In particular, the cylinders which house the pistons each comprise a pair of collars to which the air hoses are attached. These collars are relatively large and limit how proximate pistons can be placed relative to one another. In order to overcome this drawback, the prior art discloses valves which are arranged in a staggered format. However, this has the added drawback that the pistons are difficult to access for maintenance, adjustment and the like.

Another drawback of these prior art devices is that the speed of the pistons may vary over time due to the effects of wear and tear, dirt and the like. This in turn affects the accuracy if the mechanism and must be compensated for, typically through manual calibration.

SUMMARY OF THE INVENTION

In order to overcome the above and other drawbacks there is disclosed a pneumatic piston assembly comprising a plurality of pistons arranged in parallel, each of the pistons comprising a cylinder and a piston shaft moveable between a retracted position and an extended position, a first collar for supporting the cylinders at a first end and a second collar for supporting the cylinders at a second end, for each of the cylinders, a first air inlet through the first collar into the first cylinder end and a second air inlet through the second collar into the second cylinder end, a plurality of valves, each of the valves connected to a source of compressed air, and a plurality of air hoses interconnecting each of the valves with one of the air inlets.

There is also disclosed a method for determining, in a deflector assembly comprised of a plurality of segments, a reaction time interval and a travel time interval of a selected segment. The method comprises the steps of providing a sensor for sensing when the selected segment is in a first position, placing the selected segment in the first position, calculating a first time interval between commanding the selected segment to move from the first position to a second position and when the selected segment is no longer in the first position, and calculating a second time interval between commanding the selected segment to move from the second position to the first position and when the selected segment is in the first position, deriving the reaction time interval from the first time interval, and deriving the travel time interval from the second time interval and the first time interval.

Additionally, there is disclose a sensing assembly for determining, in a deflector assembly comprised of a plurality of the segments, when a selected segment moveable between a first position and a second position is in the first position. The assembly comprises a light source emitting a light beam traveling along a first path, and a member attached to the selected segment and adapted for movement therewith along a second path intersecting the first path. When the member intersects the light beam, the segment is in the first position.

Furthermore, there is disclosed a sensing assembly for determining, in a deflector assembly comprised of a plurality of the segments, when a selected segment moveable between a first position and a second position is in the first position. The assembly comprises a light source emitting a light beam traveling along a first path, and a member attached to the selected segment and adapted for movement therewith along a second path intersecting the first path. When the member no longer intersects the light beam, the segment is in the first position.

In addition, there is disclosed a deflector assembly for laterally deflecting selected articles in a stream of like spaced articles travelling along a lane of a conveyor belt with a direction of travel. The assembly comprises a plurality of adjacent segments, each of the segments comprising an article deflecting face, and a plurality of adjacent pneumatic pistons, each of the pistons comprising a shaft having a longitudinal axis arranged at an angle to the direction of travel and an end attached to a corresponding one of the segments for moving the corresponding segment along the longitudinal axis between a retracted position and an extended position. Each of the longitudinal axes are in parallel and lie in the same plane and further wherein a width of each of the segments is substantially the same as a spacing between adjacent longitudinal axes and wherein when in the extended position the segments form together a deflecting surface leading out of the lane.

Also, there is disclosed a method for laterally deflecting selected articles in a stream of spaced articles, the articles travelling along a lane of a conveyor belt with a direction of travel and having a width greater than a minimum width. The method comprises the steps of providing a plurality of segments arranged side by side, each of the segments comprising a width which is less than about one half the sum of the minimum width and a minimum spacing between the articles in the direction of travel, an article deflecting face, and a piston for moving the segment along a path at a second angle between a retracted position and an extended position, at a calibrating step, for each of the plurality of segments determining a first delay for moving the segments out of the retracted position and a second delay for moving the segments between the extended position and the retracted position, and at a subsequent operating step detecting each of the selected articles at a predetermined position along the conveyor belt, encoding a distance traveled by the conveyor belt, and individually extending and retracting each of the segments at any given point in time using the first and second delays, the detected positions and the measured widths such that only those segments are extended which are necessary for deflecting the selected articles off the lane at this point in time or immediately thereafter.

DETAILED DESCRIPTION OF THE ILLUSTRATIVE EMBODIMENTS

Figure 1:
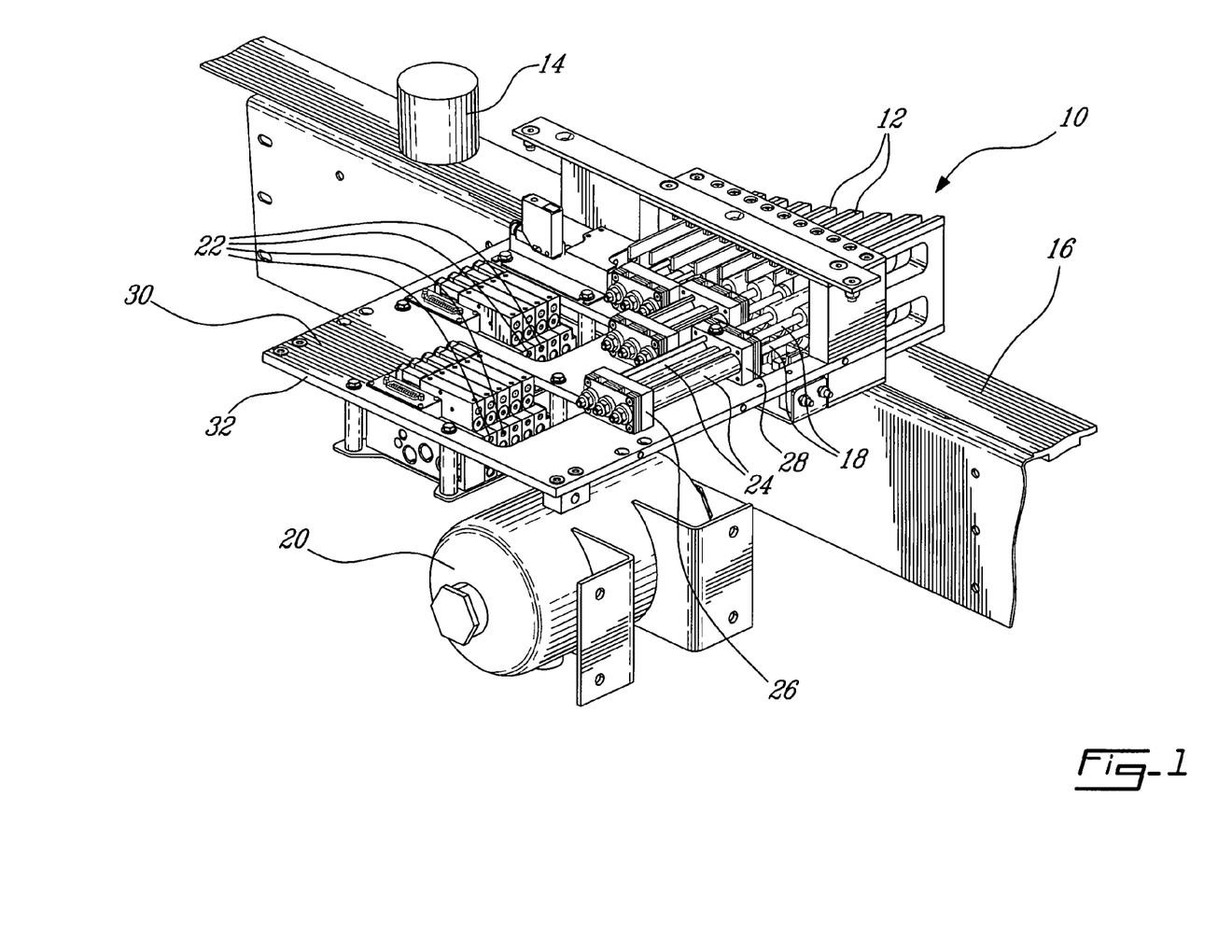
FIG. 1 is an upper rear perspective view of a deflector assembly in accordance with an illustrative embodiment of the present invention.

Referring now to FIG. 1, a deflector assembly in accordance with an illustrative embodiment of the present invention, generally referred to using the reference numeral 10, is disclosed. The deflector assembly 10 is comprised of a series of extendable segments as in 12 which, when extended, project into the path of articles as in 14 (typically largely cylindrical articles such as bottles or the like) travelling along a first conveyor belt 16. The segments as in 12 are typically manufactured from a light resilient material such as plastic or the like.

Still referring to FIG. 1, the segments as in 12 are illustratively actuated by a corresponding series of pistons as in 18 selectively moveable between at least an extended position, where the segment 12 deflects articles as in 14 travelling on the conveyor belt 16 and a retracted position, where the segment 12 is no longer projecting over the conveyor belt 16. Illustratively, the force used to drive the pistons is compressed air which is supplied by a tank 20 via a series of valves as in 22. Note that, although in the present illustrative embodiment a compressed gas is used to extend and retract the pistons 18, in alternative embodiments hydraulic pistons, solenoids and springs or the like, as well as combinations thereof, could also be used.

Figure 2:
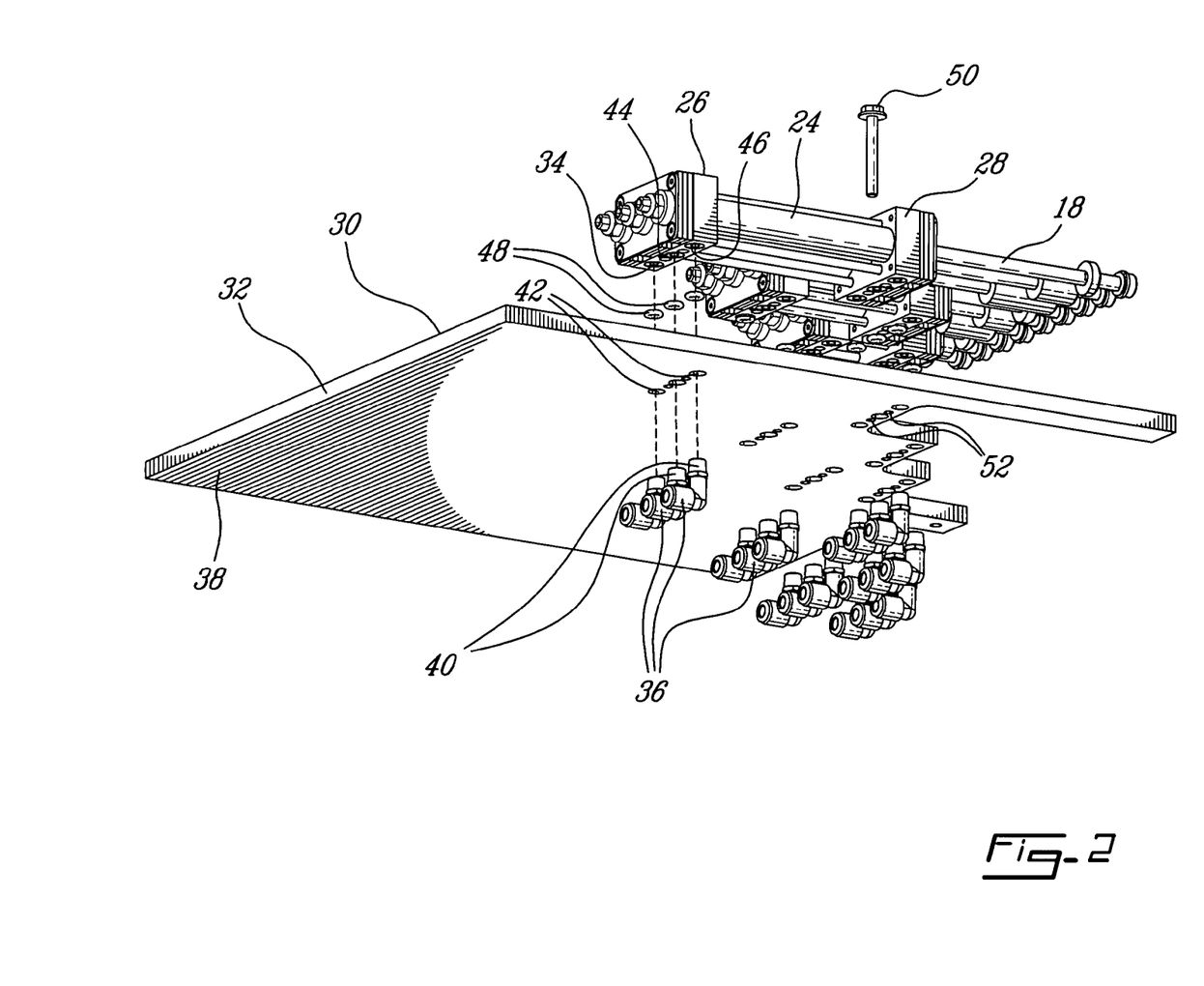
FIG. 2 is a bottom rear exploded perspective view of pistons, inlet pipes and mounting plate of the deflector assembly of FIG. 1.

Referring now to FIG. 2, each piston as in 18 is housed within a cylinder 24 which is sandwiched between a first collar 26 and a second collar 28. The collars as in 26, 28 serve the dual purpose of providing a base for attaching the cylinder 24 to the upper surface 30 of a mounting plate 32 as well as illustratively providing passageways as in 34 for compressed air to enter the cylinder 24 via the inlet pipes as in 36 and thus eliminating the need for individual collars on each of the cylinders as in 24. The inlet pipes 36 are in turn mounted to the bottom surface 38 of the mounting plate 32 by mating a threaded end 40 of each inlet pipe 36 into a corresponding threaded hole as in 42 machined through the mounting plate 32. In order to ensure an air tight seal between the passageways as in 34 and the upper surface 30 of the mounting plate 32, a series of seats as in 44 are machined into the lower surfaces 46 of each of the collars as in 26, 28 around the passageways as in 34 and, during assembly, suitable rubber gaskets as in 48 are compressed therein.

Still referring to FIG. 2, of note is that in the illustrated embodiment, a pair of collars as in 26, 28 is used to mount three (3) cylinders 24 to the mounting plate 32. Each collar as in 26 or 28 is attached to the mounting plate 30 by a pair of bolts as in 50 which mate with corresponding threaded holes as in 52 machined in the mounting plate 32. A person of ordinary skill in the art will now understand that the three (3) cylinders as in 24 can be removed as a unit from the mounting plate 32 simply by removing the bolts as in 50 holding the corresponding pair of collars 26, 28 in place while leaving the inlet pipes as in 36 mounted to the bottom surface 38 of the mounting plate 30, thereby simplifying maintenance. Additionally, provision of two or more cylinders as in 24 sharing the same collars 26, 28 allows the cylinders as in 24, and therefore the pistons 18, to be placed closer without the necessity of staggering the cylinders vertically, horizontally or diagonally.

Figure 3A:
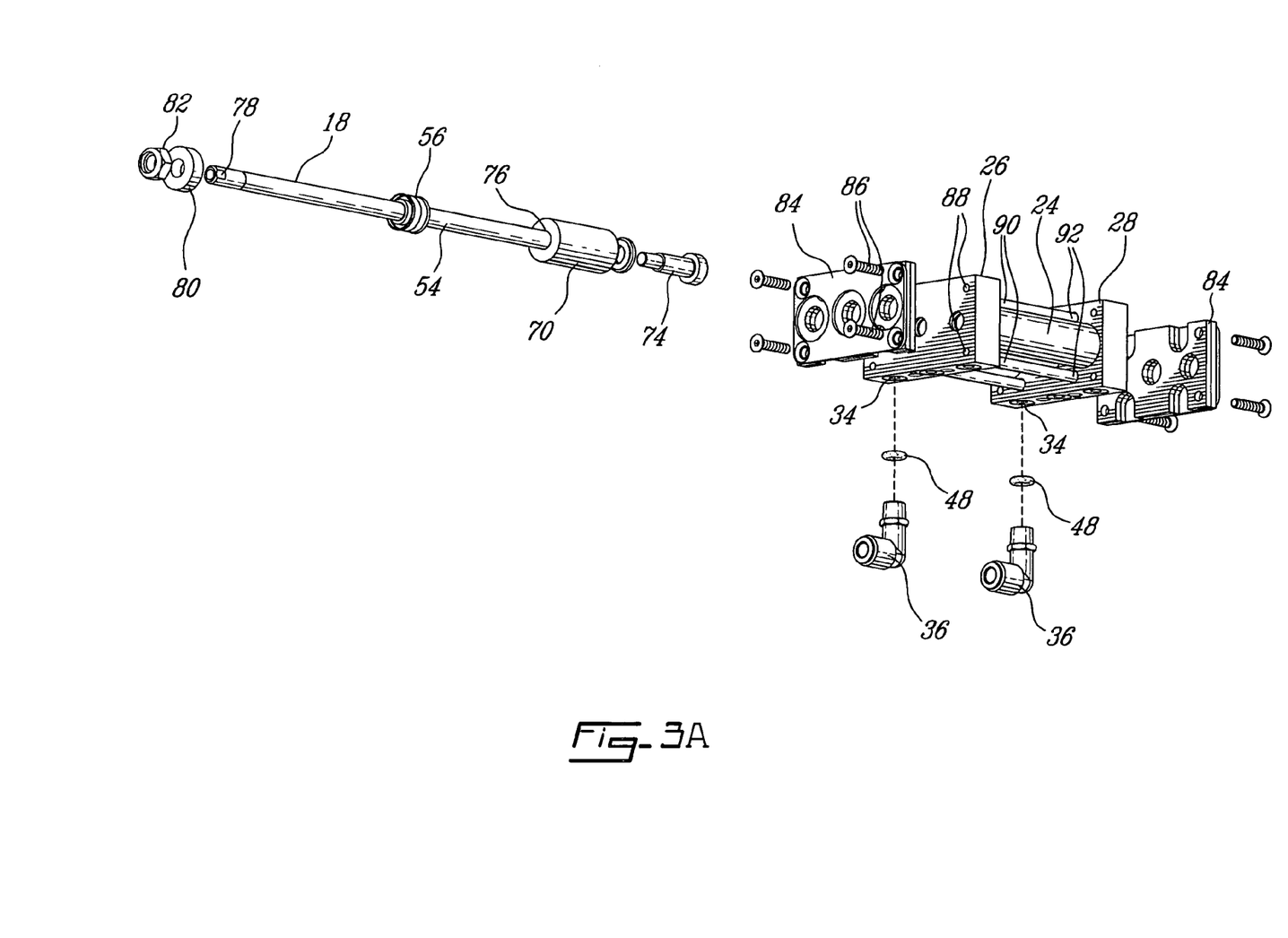
FIG. 3A is a lower front exploded perspective view of a piston shaft, cylinder, collars and inlet pipes of the deflector assembly of FIG. 1.
Figure 3B:
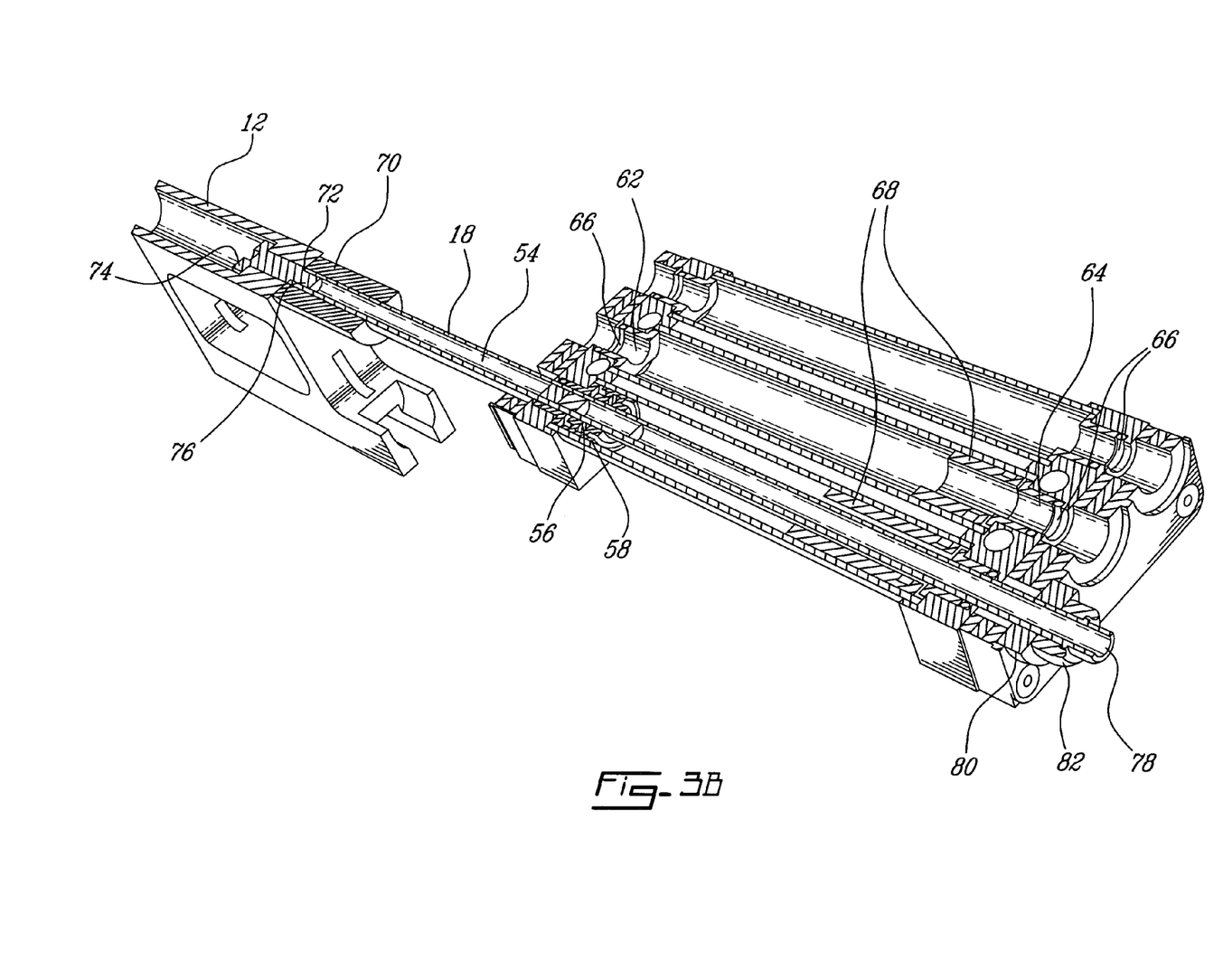
FIG. 3B is an upper rear cutaway view of a piston and segment of the deflector assembly of FIG. 1.

Referring now to FIGS. 3A and 3B, each piston 18 is comprised of a piston shaft (or rod) 54 and a head 56 secured to the piston shaft 54 towards a centre thereof. The head 56 is typically manufactured from a resilient material such metal but includes a gasket 58 or the like which forms an air tight seal with the inner surface 60 of the cylinder 24. The shaft 54 is supported at either end within the cylinder by a pair of bushings 62, 64. Additionally, gaskets as in 66 are provided at either end of the cylinder 24 and encircling the piston shaft 54 in order to ensure that compressed gas does not escape from the cylinder. As known in the art, as compressed gas (typically compressed air) is introduced into the cylinder 24 via a passageway as in 34 located at one end of the cylinder 24, (and provided the passageway as in 34 located at the other end of the cylinder 24 is open) the compressed gas will drive the head 56, and thus the shaft 54, towards the opposite end of the cylinder 24. A reciprocal effect is caused by introducing the compressed gas via the passageway located at the other end of the cylinder 24.

Still referring to FIG. 3B, illustratively, the internal length of the cylinder 24 may be shortened by a predetermined amount introducing inserts as in 68 (typically manufactured from a material such as hard rubber or plastic) into the cylinder 24. By occupying a portion of the cylinder 24 into which the head 56 never travels, the inserts as in 68 reduces the amount of compressed gas within the cylinder and improve to some degree the reaction time, and this the speed of extension and retraction of the piston shaft 54. Additionally, although the length of travel of the head 56 and therefore the shaft 54 could also be limited by the internal length of the cylinder 24, in the case at hand the length of travel is illustratively limited using bumpers as in 70 of varying lengths mounted towards a first end 72 of the shaft 54 and held in place, for example, by the segment 12, which is also mounted to the first end 72 using for example a threaded bolt 74 which is introduced into a suitably machined and threaded hole 76 bored in the first end 72 of the shaft 54. The shaft 54 is retained within the cylinder 24 at a second end 78 thereof by provision of, for example, an impact resistant washer 80, typically manufactured from hard rubber or plastic or the like, which is secured to the second end 78 of the shaft 54, for example, via a bolt 82 which engages a suitably threaded surface of the second end 78 of the shaft 54.

Referring back to FIG. 3A, in order to better absorb impact and protect the cylinders as in 24 from forces exerted by the bumpers 70 or washers 80 on their respective collars 26, 28, an impact absorbing plate 84, manufactured from rubber or plastic or the like, is mounted to each of the collars 26, 28, illustratively using four (4) bolts 86 which are tightened into corresponding threaded holes 88 machined in each of the collars 26, 28. Additionally, in order to hold the cylinders 24 securely between the collars 26, 28, the collars 26, 28 are illustratively interconnected by four (4) rods as in 90 the ends of which are engaged in suitably threaded holes 92 machined in the collars 26, 28.

Figure 4:
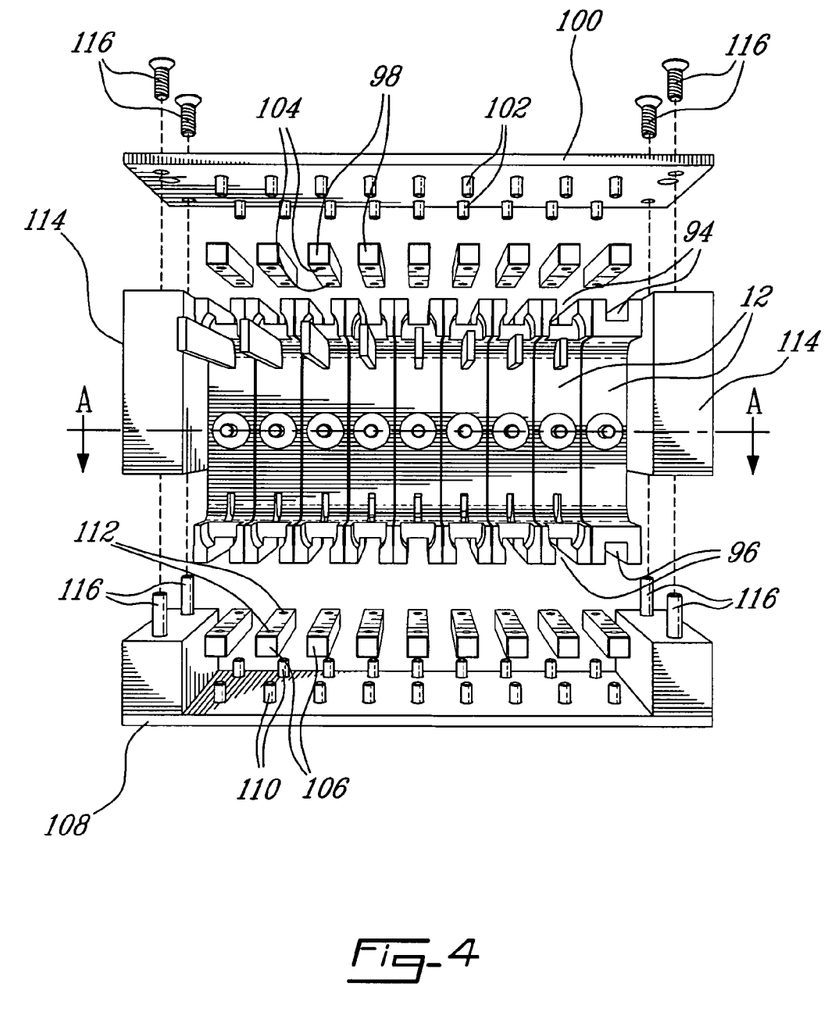
FIG. 4 is a rear exploded perspective view of the segments of the deflector assembly of FIG. 1.

Referring now to FIG. 4, as discussed above the segments 12 are mounted to the first ends 72 of the shafts 54 and arranged in close proximity to one another side by side within a guide frame. In order to ensure that the segments as in 12 run true, thereby reducing the chance that adjacent segments 12 foul one another as they are extended and retracted, each of the segments 12 is illustratively provided with an upper guide 94 and a lower guide 96. The upper guides as in 94 engage corresponding upper rails as in 98 illustratively fastened to the guide frame top 100 via a series of bolts as in 102 which engage corresponding threaded holes as in 104 machined in the upper rails 98. Similarly, the lower guides as in 96 engage corresponding lower rails as in 106 illustratively fastened to the guide frame bottom 108 via a series of bolts as in 110 which engage corresponding threaded holes as in 112 machined in the lower rails 106. The guide frame top 100 and guide frame bottom 108 are in turn securely fastened together via a pair of opposed guide frame sides as in 114 and fastening hardware as in 116.

Still referring to FIG. 4, as discussed above in reference to FIG. 2, provision of two or more cylinders as in 24 sharing the same collars 26, 28 allows the cylinders as in 24, and therefore the pistons 18, to be placed closer without the necessity of staggering the cylinders vertically, horizontally or diagonally. This allows for adjacent segments as in 12 to be attached to the first ends 72 of their corresponding shafts 54 at the same level (for example as indicated along the dashed line A in FIG. 4), even for segments as in 12 of relatively small width, while maintaining a maximum diameter of the cylinders 24. On the one hand this configuration allows for all the shafts 54 to be attached towards the centres of the segments as in 12 which, given the typically symmetrical nature of the segments as in 12 around the horizontal plane which intersects the dashed line A in FIG. 4, eliminates rotational forces which would otherwise be brought to bear on the first ends 72 of the shafts 54 during extension and retraction of the segments 12. Although small, such forces increase friction, thereby reducing the speed of extension and retraction, and over time cause uneven wear on both the cylinder 24, shaft 54, head 56 and other elements such as the bushings 62, 64, etc. Additionally, as all the shafts 54 are attached towards the centres of the segments as in 12, the need to re machine or counter weight the segments as in 12 in order eliminate the above discussed rotational forces is also eliminated.

Figure 5:
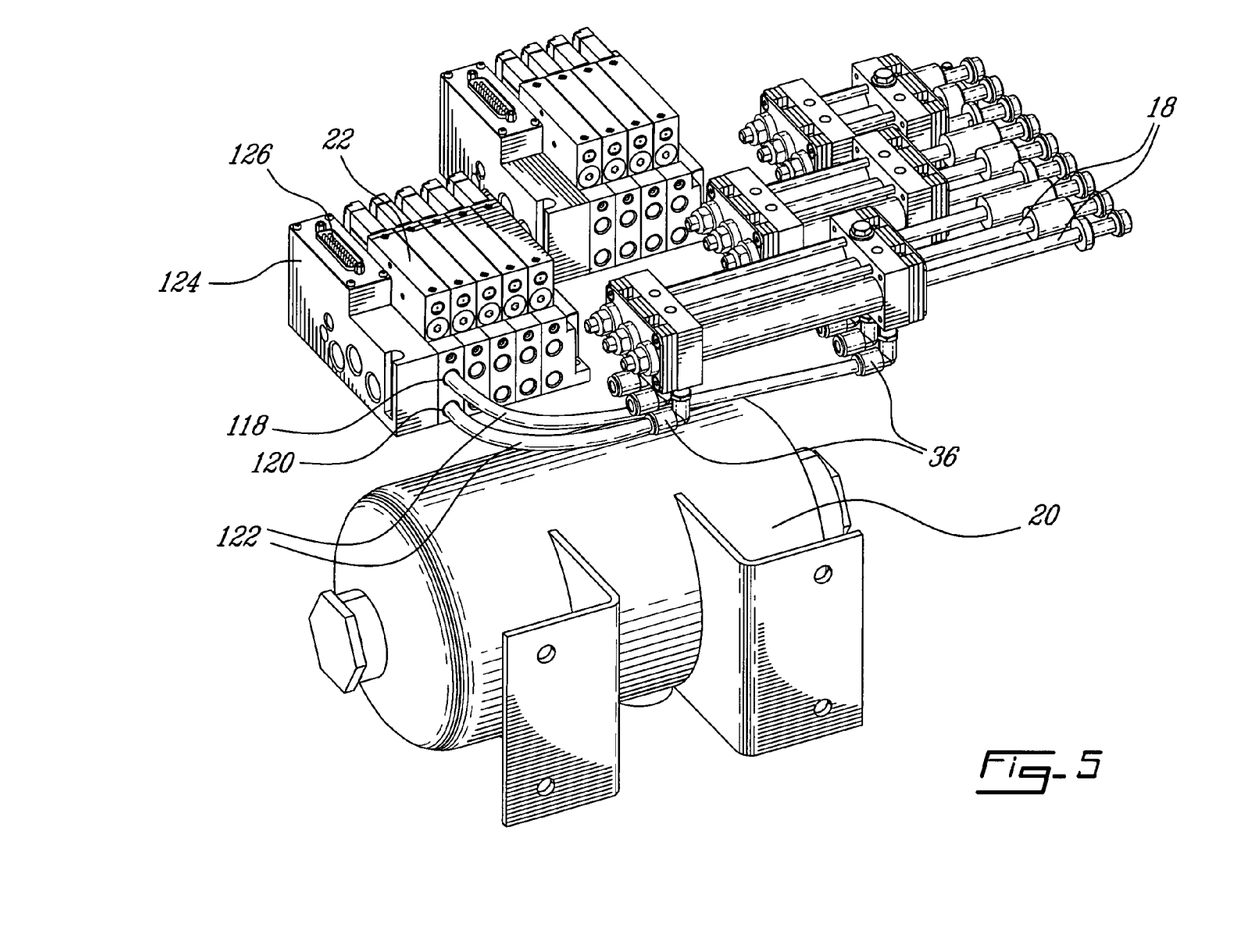
FIG. 5 is an upper rear perspective view of the pistons, valves, controllers, hoses and tank of the deflector assembly of FIG. 1.

Referring now to FIG. 5, as discussed above, extension or retraction of the pistons as in 18 (and therefore the segments as in 12) may be individually controlled by controlling the flow of compressed gas from the tank 20 to the pistons 18 via a series of valves as in 22. Each valve as in 22 comprises a first outlet 118 and a second outlet 120 connected to respective ends of their respective cylinders as in 24 via a pair of hoses as in 122 and inlet pipes 36. As known in the art, such valves are typically driven by a solenoid (not shown) which may actuated remotely by a controller 124. The controller 124 typically includes both memory and a software program (both not shown) and typically may be configured via an interface 126, for example by attaching an appropriate computing device such as a notebook computer (not shown) to the interface 126 by an appropriate cable (also not shown). In an alternative illustrative embodiment the valves as in 22 may be operated remotely by an external controller (not shown) which is interconnected with the valves 22 via the interface 126 and/or a communication network (not shown).

Figure 6A:
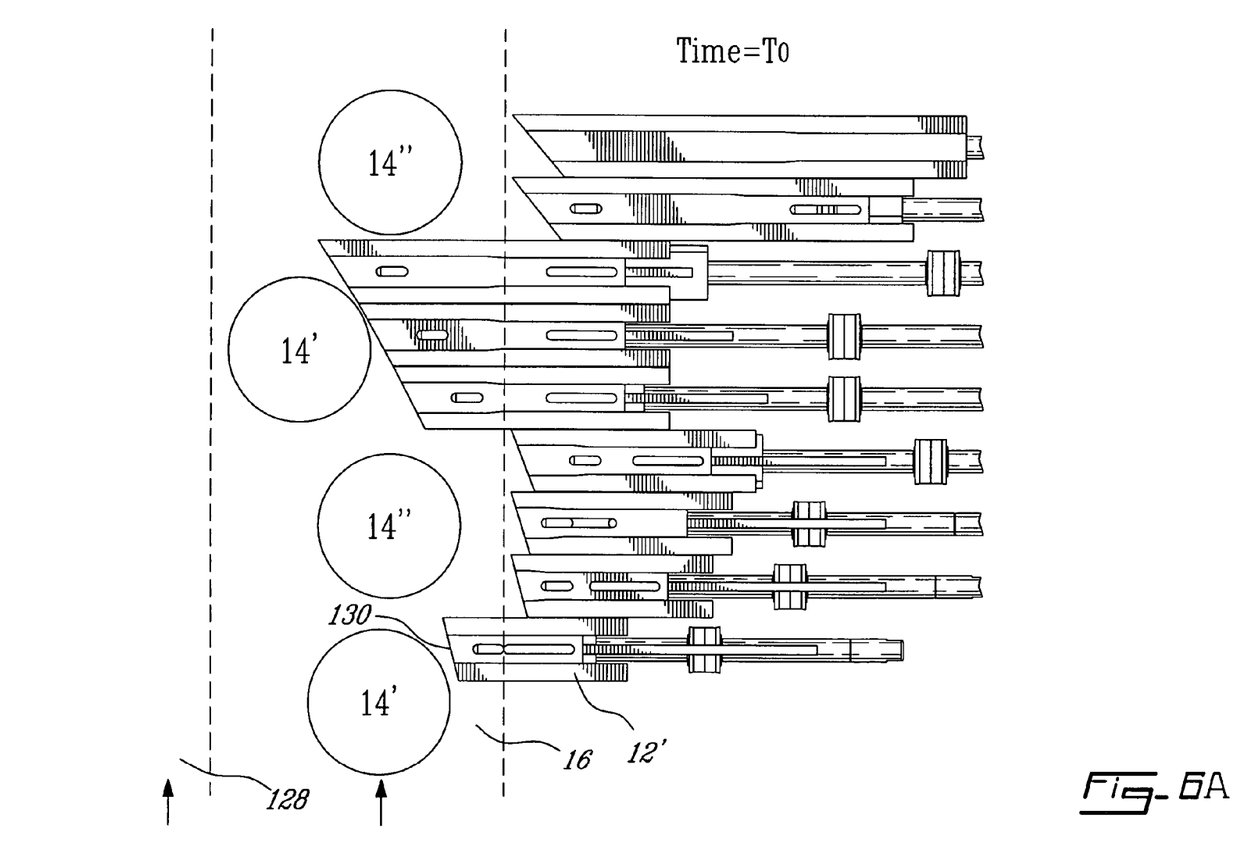
FIGS. 6A through 6C are top plan views of the segments and piston shafts of the deflector assembly of FIG. 1.
Figure 6B:
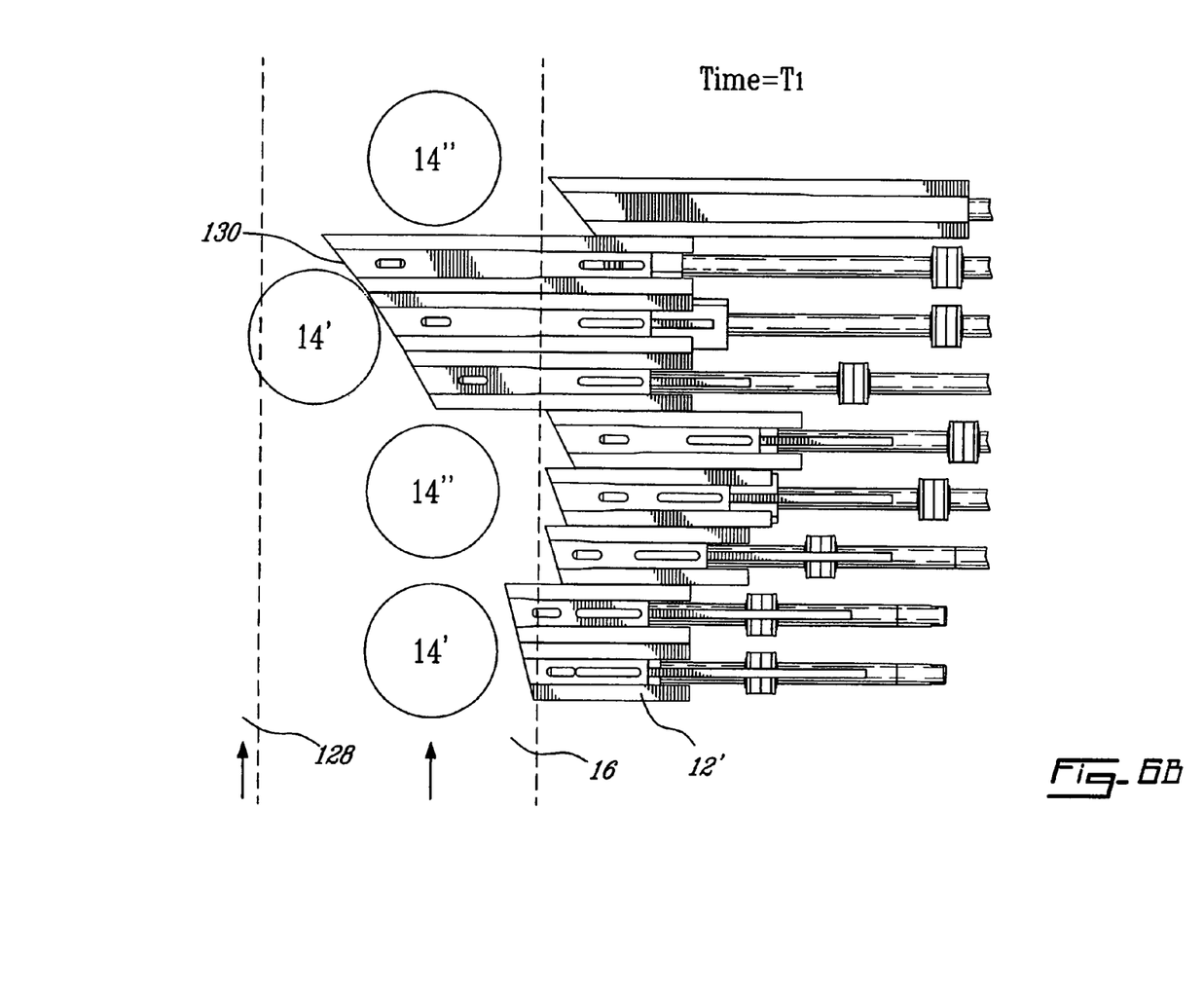
Figure 6C:
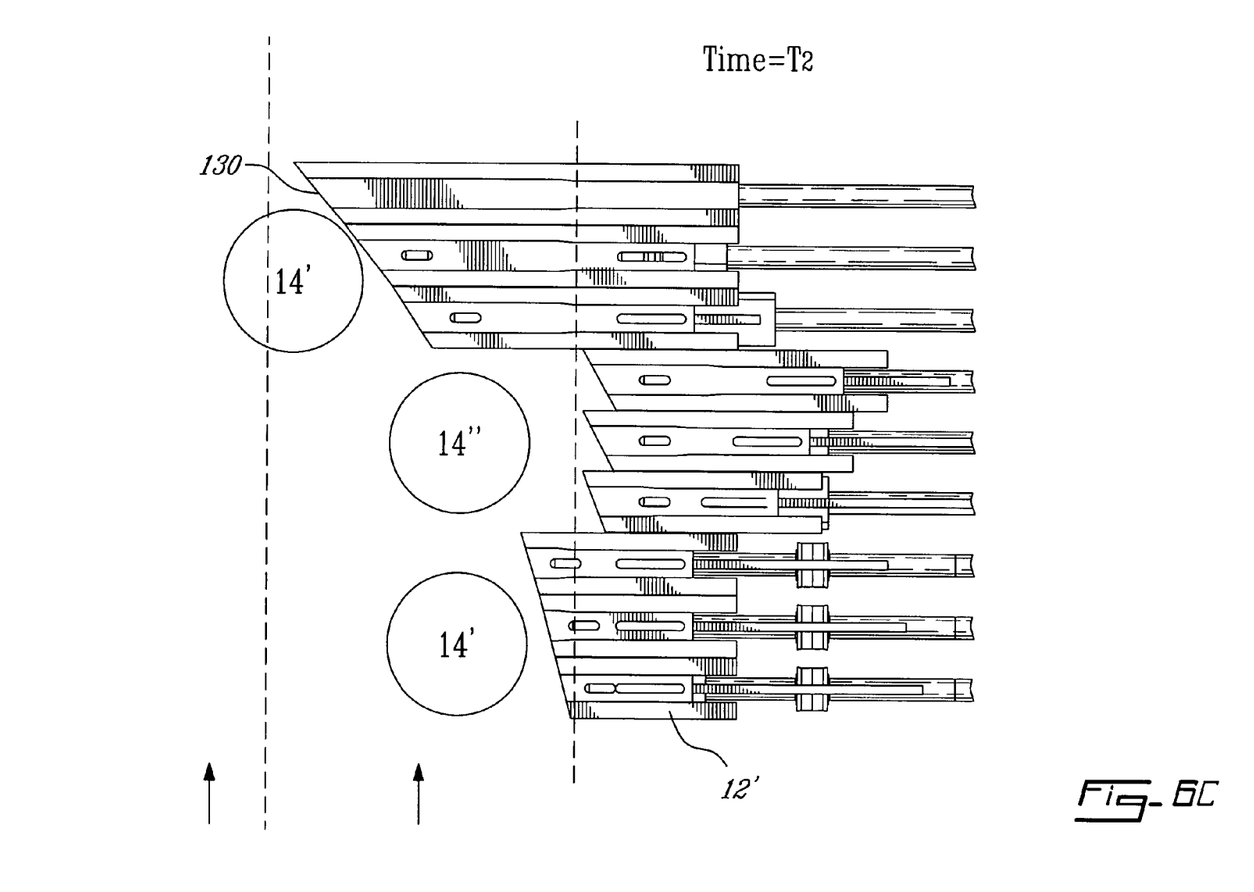

Referring now to FIGS. 6A through 6C in addition to FIG. 5, it will now be apparent to a person of skill in the art that the assembly 10 can be used to generally deflect articles travelling in a lane along a conveyor belt 16 onto a different lane or adjacent conveyor belt 128 running side by side with the conveyor belt 16 or into a refuse bin (not shown), etc. The decision to deflect an article as in 14 (e.g. in the case at hand move it to an adjacent lane or conveyor belt 128) or allow it to continue along the conveyor belt 16 is provided by an inspection station (not shown). The controller uses this information, together with information concerning the distance traveled by the conveyor belt 16 and the distance which must be traveled by an article as in 14 from the inspection station to the segments as in 12 in order to apply compressed air to the pistons such that the segments as in 12 are extended or retracted such that rejected articles as in 14' can be removed from the conveyor belt 16 without interfering with the passage of non-rejected articles as in 14". In this regard, a given segment as in 12 need only be extended when the travel of the rejected article as in 14' along the conveyor belt 16 places it more or less in front of a given segment as in 12 such that when the segment as in 12 is extended its deflecting face as in 130 will come into contact with the article. It will now be apparent to persons of ordinary skill in the art that rejected articles 14' can be removed from a series of even closely spaced articles as in 14 without interfering with the passage of the non-rejected articles as in 14". Of note is that, in order to selectively deal correctly with all articles travelling along the conveyor belt, the width of a given segment should illustratively be less than about one half of a sum of the dimension of one of the articles and a minimum spacing between the articles in the direction of travel.

Of note is that the deflecting face 130 of a given segment as in 12 is illustratively angled (or curved) such that an angle of successive deflecting faces as in 130 with the direction of travel is increasingly more acute. As will now be apparent to one of ordinary skill in the art, when all segments as in 12 are extended, their deflecting faces as in 130 combine to form a generally concave surface which gradually curves away from the conveyor belt 16. The curved or concave surface provides for a more even acceleration of the article as in 14 as it is deflected off the lane of the conveyor belt 16. This reduces in part the possibility that the article will be knocked over by one or other of the segments as in 12. A person of skill in the art will understand, however, that this surface could also be flat (i.e. not concave), etc.

Additionally, although the segments as in 12 are illustratively shown as being extendable or retractable along a path at right angles to a direction of travel of the conveyor belt 16, in an alternative illustrative embodiment the segments as in 12 could be extended along a path which is at an obtuse angle to the direction of travel (that is, greater than 90 degrees).

Figure 7:
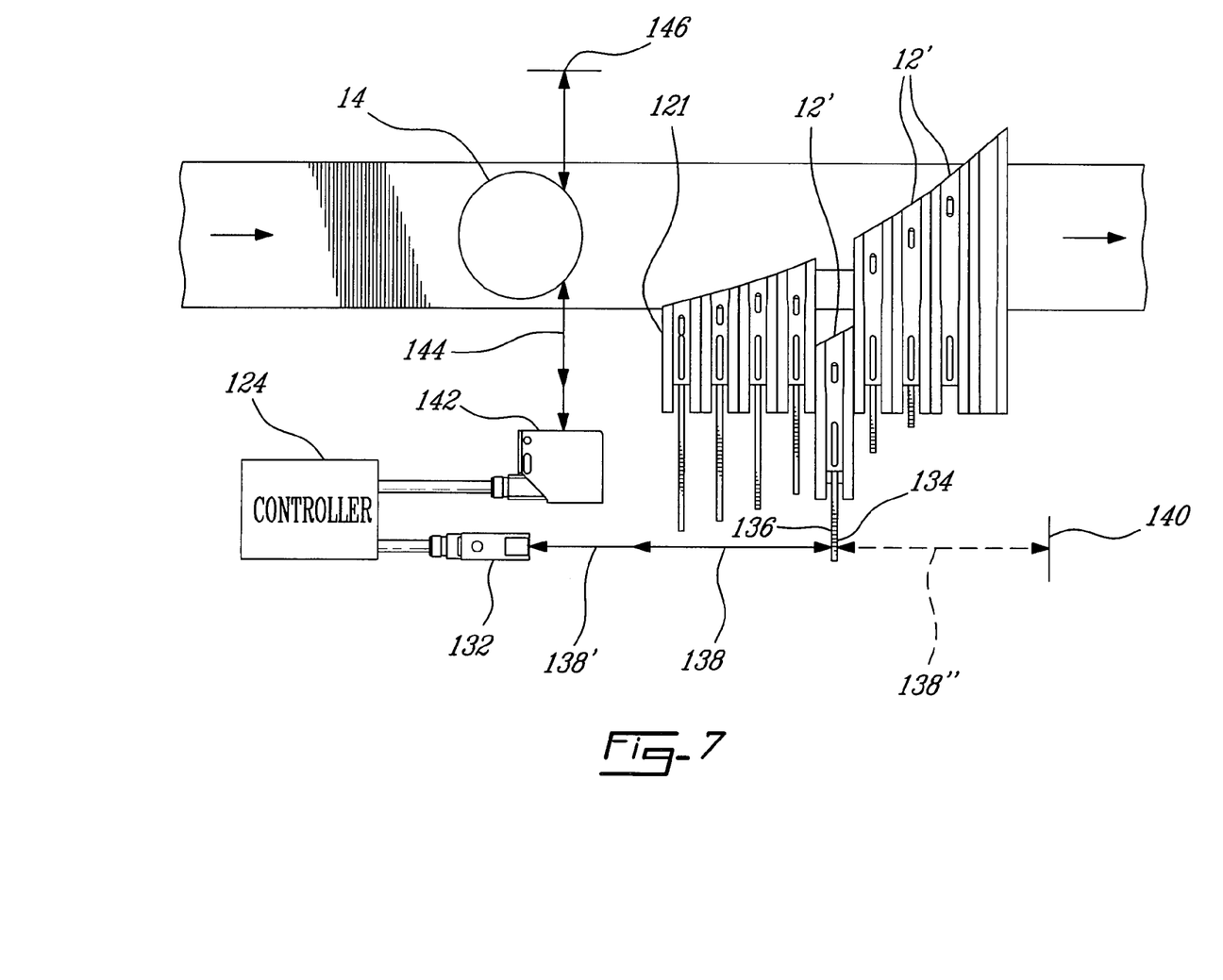
FIG. 7 is a top plan view of a conveyor belt, segments, controller and sensors in accordance with an illustrative embodiment of the present invention.

Referring now to FIG. 7, as discussed above, during normal operation the speed at which the segments as in 12 can be extended and retracted will vary over time due to dirt, wear and tear and the like. Accurate information as to the speed at which a segment as in 12 can be extended or retracted is necessary to ensure correct operation of the system and can become critical where the spacing between subsequent articles as in 14 is small. As a result, the controller 124 is equipped with a calibration system. The calibration system is comprised of a sensor 132 and a series of segment's members as in 134, one of the members as in 134 with a reflective surface 136, one of the segment's members as in 134 attached to each of the segments as in 12. The sensor 132 is comprised of, for example, a photoelectric reflex switch comprising a light source (not shown) which transmits a light beam 138. Provided at last one of the segments as in 12 is retracted, the light beam is reflected off a reflective surface 136 of the retracted segment's reflective member 134. The reflected light beam 138' is received by a photodetector (also not shown) also housed within the sensor 132.

Still referring to FIG. 7, in an alternative illustrative embodiment each of the segment's members as in 134 are opaque and are not equipped with a reflective surface 138 and there is further provided a reflective pad 140 positioned in the path of the light beam 138. Retraction of a segment 12' causes the opaque member 134 corresponding to that segment 12' to be inserted between the sensor 132 and the reflective pad 140. As will now be apparent to a person of skill in the art, as the member 134 is opaque this prevents the light beam 138" from reaching the reflective pad 140 and hence from being reflected back to the sensor 132, as there is no light crossing the space 138" between the opaque member 134 and the reflective pad 140 thereby indicating to the sensor that the segment 12' has been retracted.

Still referring to FIG. 7, the first step in calibrating each segment comprises determining the time it takes for a command provided by the controller 124 to extend a retracted segment as in 12 to be carried out. This calibration may be carried out as follows. All segments as in 12 except for the segment being calibrated 12' are extended such that their members as in 134 do not fall into the path of the light beam 138. A command is given by the controller 124 to the valves (reference 22 in FIG. 5) to extend the segment being calibrated 12' by supplying air to the rear inlet pipe (reference 36 in FIG. 5) of the cylinder 24 in question. The time between the giving of the command by the controller 124 and the movement of the reflective surfaces 136 out of the path of the light beam 138 is determined and stored. As will now be apparent to a person of skill in the art, this measured time provides an indication to the controller 124 of the delay which can be expected before a command results in a movement of the segment as in 12'.

As the speed at which commands are carried out may vary slightly from one extension to another, this process may be repeated a number of times (optimally 4 or 5 times) in order to provide, for example, worst case values. More generally, the calibration step can be use to determine a weighted average $T_{avg}$ of the speed at which the commands are carried out according to the following function:

$$T_{avg} = \frac{\sum_{i=1}^{N} T_i \cdot X_i}{\sum_{i=1}^{N} X_i} \quad (1)$$

where N is the number of repetitions, $T_i$ is the $i^{th}$ measured time interval and $X_i$ is the $i^{th}$ weighting factor. Although they may be different (but are typically the same value), the weighting factors have a value of greater than or equal to 0 and less than or equal to 1. Additionally, the sum of all factors must be greater than 0.

Still referring to FIG. 7, the second step in calibrating each segment is determining the time it takes for a segment as in 12 to be retracted. In this regard, all segments as in 12 including the segment being calibrated 12' are extended. A command to retract the segment being calibrated 12' is given by the controller and the time between the giving of this command and the movement of the reflective surface 136 into the path of the light beam 138 is determined and stored.

Again, as the speed at which a given segment as in 12 is retracted may vary slightly from one retraction to another, this process may be repeated a number of times (again, optimally about 4 or 5 times) in order to provide worst case values. More generally, and as a person of skill in the art will also now appreciate, the calibration step can be use to determine a weighted average of the speed at which a given segment as in 12 is retracted similar to the formula at (1) as discussed hereinabove and used for calculating the speed at which the commands are carried out.

The above segment calibration steps may be repeated for all the segments as in 12 as necessary. Additionally, the controller 124 can be programmed to carry out the auto calibration at opportune moments, for example whenever the conveyor 16 is free of articles as in 14. In this way an ongoing accurate description of the movement of the segments as in 12 can be determined thereby providing for continued accurate operation of the deflector assembly 10.

Note that in an alternative embodiment the sensor 132 and series of members 134 with a reflective surface 136 could be replaced by other types of sensors, for example a hall effect or pressure sensor attached to each piston as in 18 which indicates when the segment as in 12 is in a retracted (or alternatively extended, or both) position. This could provide for some advantages, for example the calibration of individual segments could be carried out independently on an ongoing basis during operation, without the need to resort to a special calibration routine. However, there are also disadvantages associated with equipping each cylinder in this manner including costs related to the sensors and a generally increased difficulty in removing the pistons as in 18 due to the proliferation of sensors attached or proximate to the pistons as in 18 as well as the necessary means, such as wires, used to interconnect the sensors with the controller 124.

Still referring to FIG. 7, in order to further improve the accuracy of operation of the deflector assembly 10, a second calibration may be carried out to determine the distance an article as in 14 travels along the conveyor belt 16 between the inspection station (not shown) and the individual segments as in 12 as well as the horizontal dimension of such an article.

As known in the art, an encoder (not shown) is typically attached at some point along the conveyor belt (typically to the shaft of the drive train or motor which drives the conveyor belt). The encoder typically generates a stream of pulses which are synchronised with the distance traveled by the conveyor as in 16, (or in other words, the encoder typically generates a stream of pulses, each pulse corresponding precisely to a known distance traveled by the conveyor belt 16 and thus the articles as in 14 which are carried by the conveyor belt 16). This data is generated continually and made available to the controller 124 on an on going basis. As a result, the controller 124 has an accurate description of the movement of the conveyor belt 16, and therefore the movement of articles as in 14 travelling along the conveyor belt 16. However, as discussed above the horizontal width of articles as in 14 being conveyed on the conveyor belt 16 may differ from article to article. Additionally, the positioning of other elements such as the inspection station may vary over time (for example due to the inspection station being moved to another position along the conveyor belt 16) thus requiring recalibration of the deflector assembly 10. In order to carry out this recalibration, the deflector assembly 10 is equipped with a second sensor 142 operatively attached to the controller 124 and positioned immediately in front of the first segment 121. The second sensor 142 is comprised of, for example, a photoelectric reflex switch comprising a light source (not shown) which transmits a second light beam 144 and may also include a second reflective pad 146 which reflects the light beam 144 back to the second sensor 142. The sensor detects articles as in 14 which obstruct the second light beam 144 as they travel along the conveyor belt 16 and provides an indication to the controller 124 of same.

Still referring to FIG. 7, in order to calibrate the distance traveled by an article as in 14 along the conveyor belt 16 between the inspection station (not shown) and the second sensor 142, the number of pulses between a command generated by the inspection station to reject an article 14 (which indicates the article is at the inspection station) and when the second light beam 144 is disrupted by the article 14 is counted. As each pulse represents a unit distance traveled by the conveyor belt 16, the number of pulses gives an accurate indication of the distance traveled. Similarly, the number of pulses between the disruption of the second light beam 144 and its becoming once again uninterrupted provides an accurate indication of the horizontal width of the article as in 14. Of course, a person of skill in the art will understand that the accuracy of the calculated distance can be improved by increasing the rate of generation of pulses per unit distance.

As the distance between the second light beam 144 emitted by the second sensor 142 and each of the segments as in 12, being part of the same assembly, can be accurately controlled and is well known a priori, determining the distance between the inspection station and each of the segments as in 12 can be carried out by adding the calculated pulses to these known a priori distances.

It is to be understood that the invention is not limited in its application to the details of construction and parts illustrated in the accompanying drawings and described hereinabove. The invention is capable of other embodiments and of being practised in various ways. It is also to be understood that the phraseology or terminology used herein is for the purpose of description and not limitation. Hence, although the present invention has been described hereinabove by way of preferred embodiments thereof, it can be modified, without departing from the spirit, scope and nature of the subject invention as defined in the appended claims.

What is claimed is:

1. A pneumatic piston assembly comprising:
   a plurality of independently moveable pistons arranged in parallel, each of said pistons comprising a cylinder and a piston shaft moveable between a retracted position and an extended position;
   a first collar for supporting said cylinders at a first end and a second collar for supporting said cylinders at a second end;
   for each of said cylinders, a first air inlet through said first collar into said first cylinder end and a second air inlet through said second collar into said second cylinder end;
   a plurality of valves, each of said valves connected to a source of compressed air; and
   a plurality of air hoses interconnecting each of said valves with one of said air inlets.

2. The assembly of claim 1, further comprising a mounting plate, wherein said collars are mounted on a first side of said mounting plate and said first and second inlets are through said mounting plate.

3. The assembly of claim 1, wherein said pistons are arranged in the same plane.

4. The assembly of claim 1, comprising three of said pistons.

5. The assembly of claim 1, wherein said cylinders are like cylinders and a gap between said cylinders is less than a diameter of one of said cylinders.

6. The assembly of claim 5, wherein said gap is less than 2 mms.

7. The assembly of claim 1, further comprising a plurality of segments arranged sided by side, one of said segments attached to a first end of each of said piston shafts and adapted for movement therewith and wherein when said shafts are placed in said extended positions said segments form together a deflecting surface.

* * * * *